(12) United States Patent
Wilson et al.

(10) Patent No.: US 9,064,505 B2
(45) Date of Patent: Jun. 23, 2015

(54) OPTICAL PICKUP ASSEMBLY HAVING OPTICAL PICKUP UNITS LATERALLY ARRANGED ACROSS A TAPE PATH

(71) Applicant: Oracle International Corporation, Redwood City, CA (US)

(72) Inventors: Scott Wilson, Thornton, CO (US); Daniel Underkofler, Lafayette, CO (US); Steven Suttle, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/755,476

(22) Filed: Jan. 31, 2013

(65) Prior Publication Data

US 2014/0211603 A1      Jul. 31, 2014

(51) Int. Cl.
| G11B 20/00 | (2006.01) |
| G11B 7/00 | (2006.01) |
| G11B 7/08 | (2006.01) |
| G11B 7/003 | (2006.01) |
| G11B 7/14 | (2012.01) |

(52) U.S. Cl.
CPC ...... *G11B 7/08* (2013.01); *G11B 7/003* (2013.01); *G11B 7/14* (2013.01)

(58) Field of Classification Search
CPC ........... G11B 20/1202; G11B 2220/93; G11B 27/107; G11B 7/1275; G11B 7/14; G11B 7/24009

USPC ............ 369/275.4, 283, 13.37, 13.38, 31.01, 369/44.14, 112.24; 360/241.1, 246.6, 246.8
See application file for complete search history.

(56) References Cited

U.S. PATENT DOCUMENTS

| 6,058,092 | A | 5/2000 | Masters et al. |
| 8,462,595 | B2 | 6/2013 | Wilson |
| 8,614,935 | B2 * | 12/2013 | Mahnad ..................... 369/13.37 |
| 2010/0136151 | A1 | 6/2010 | Mahnad et al. |
| 2010/0246347 | A1 * | 9/2010 | Tanaka et al. ............. 369/47.15 |
| 2012/0291055 | A1 | 11/2012 | Mahnad |
| 2013/0055297 | A1 * | 2/2013 | Kawabata .................... 720/649 |
| 2013/0094337 | A1 * | 4/2013 | Yajima et al. ............ 369/44.23 |
| 2013/0094338 | A1 * | 4/2013 | Saitoh et al. ............... 369/47.15 |
| 2013/0107692 | A1 * | 5/2013 | Tojo et al. ............... 369/112.03 |

OTHER PUBLICATIONS

European Patent Office, The International Search Report and the Written Opinion of the International Searching Authority for the corresponding PCT/US2014/013728 mailed May 12, 2014.
The International Preliminary Examining Authority, International Preliminary Report on Patentability for PCT/US2014/13728 Jan. 29, 2015.

* cited by examiner

*Primary Examiner* — Wayne Young
*Assistant Examiner* — Dionne Pendleton
(74) *Attorney, Agent, or Firm* — Brooks Kushman P.C.

(57) ABSTRACT

An optical pickup assembly includes a first optical pickup unit (OPU) and a second OPU. The OPUs are either stacked on each other in separate housings or integrated together in a common housing such that the OPUs are arranged laterally across a tape path and are positioned at a longitudinal position along the tape path.

4 Claims, 7 Drawing Sheets

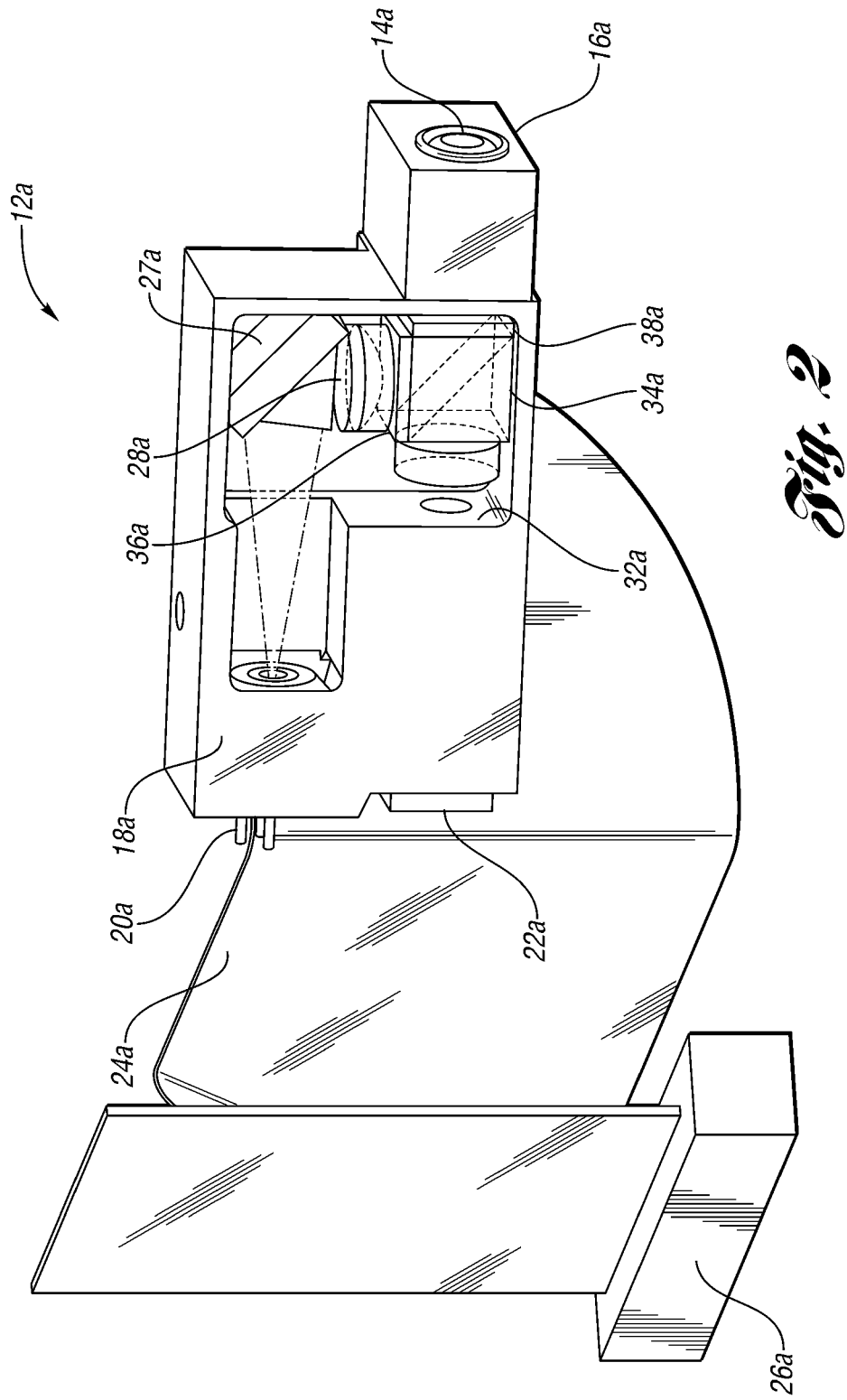

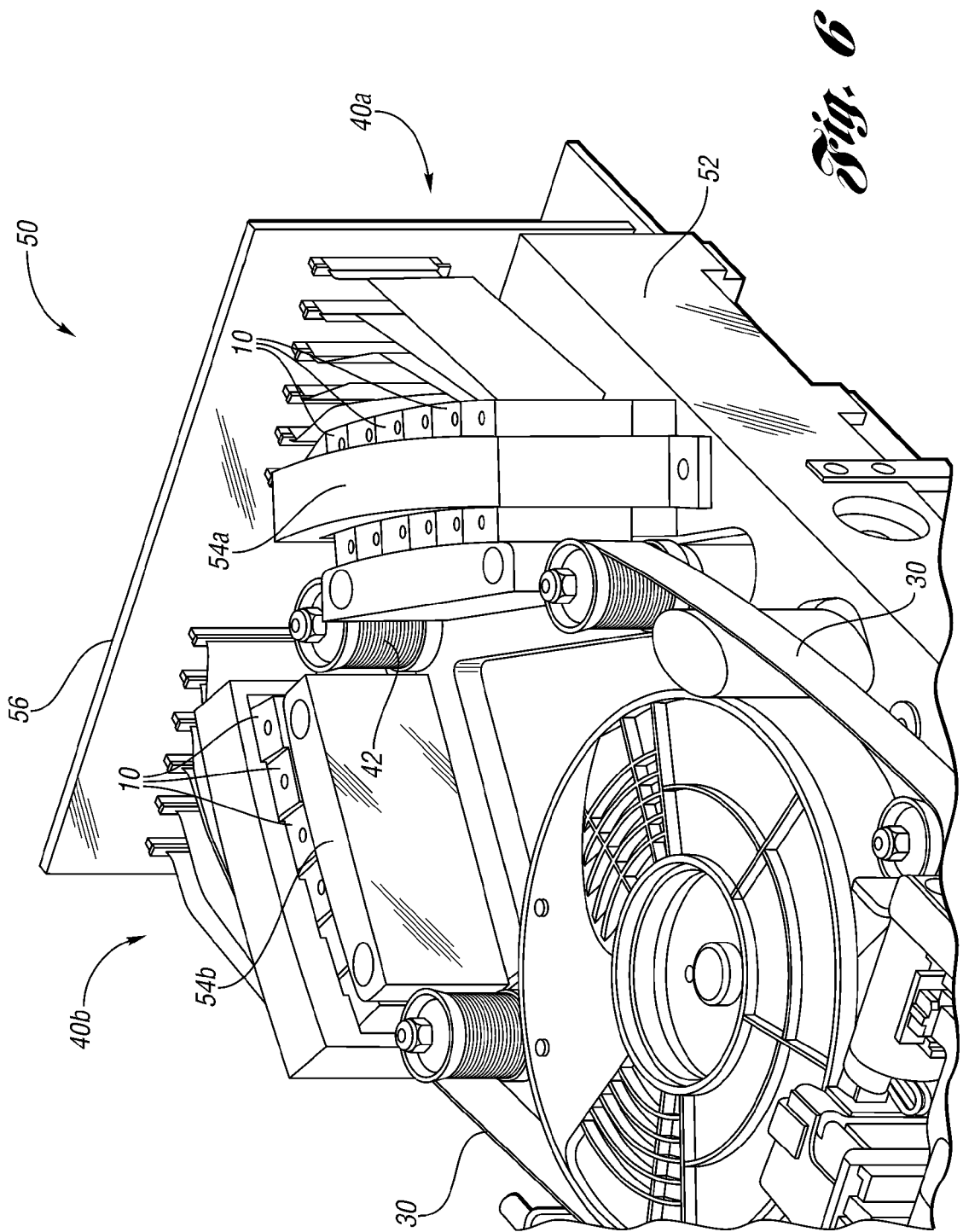

OPTICAL PICKUP ASSEMBLY HAVING OPTICAL PICKUP UNITS LATERALLY ARRANGED ACROSS A TAPE PATH

TECHNICAL FIELD

The present invention relates to optical pickup units for reading and writing on optical tape.

BACKGROUND

Optical tape for data storage has the potential for relatively large areal densities. However, data transfer rate is also desirable. Magnetic linear tape addresses transfer rate by simultaneously reading/writing with multiple heads (e.g., such as thirty-two heads). The heads are constructed on micron scales using semiconductor technology such that the heads may be laterally arrayed at low spacing (e.g., such as 90 μm).

Optical pickup units are used in optical data tape storage machines to read and write data on an optical tape. An optical pickup unit (OPU) typically includes a laser, a lens, lateral and focusing actuators for the lens, optical paths, and mounting structures. An OPU is considerably more bulky than a magnetic head.

A single OPU may be used in disk products having adequate room laterally (i.e., radially) for the OPU components. The use of multiple OPUs is required to meet optical tape data transfer requirements. In prototype drives, multiple OPUs have been arrayed longitudinally along the tape path. The multiple OPU longitudinal arrangement is limited by or limits the following. The available drive space for the tape path and OPU footprints is limited. The tape path layout/design options are limited. The lateral tape motion (LTM) is well controlled only in relatively small portion(s) along the length of the tape path. The OPUs that might be designed for the longitudinal arrays would have a narrow footprint, which limits space for mounting and alignment features. Lasers in each of the OPUs generate heat during operation and cause their temperature to rise. Operating at high temperatures contributes to premature degradation of the lasers and impact the reliability of the drive. Having many lasers mounted closely together creates a challenge to keep the lasers from getting excessively warm and degrading their lifetime. Hence, there is limited space for multiple OPUs and limited means for keeping them cool.

SUMMARY

Embodiments of the present invention provide an optical pickup assembly having a first optical pickup unit (OPU) and a second OPU. In one variation, the optical pickup assembly has a stacked individual OPU pair design in which the OPUs are stacked on each other such that the OPUs are arranged laterally across a tape path and are positioned roughly at the same longitudinal position along the tape path. In another variation, the optical pickup assembly has an integrated OPU pair design in which the OPUs are integrated together in a common housing such that the OPUs are arranged laterally across a tape path and are positioned roughly at the same longitudinal position along the tape path.

Each OPU may include an objective lens for transmitting light to an optical tape configured to move along the tape path and for receiving light from the optical tape. One of the objective lenses of the OPUs is laterally higher than the other one of the objective lenses of the OPUs. The objective lenses of the OPUs may be longitudinally offset from one another along the tape path.

In the stacked individual OPU pair design, each OPU has its own separate housing. The OPUs are stacked on each other by the housings being arranged laterally on each other. Each OPU may further include an objective lens connected to the housing of that OPU. In this case, the housing of the first OPU is arranged laterally above on the housing of the second OPU with the objective lens of the first OPU being laterally higher than the objective lens of the second OPU. Again, the objective lenses may be longitudinally offset from one another along the tape path.

In an embodiment, the first and second OPUs include the same type of components.

In an embodiment, each OPU includes transmission and reception light paths, a laser source, a photo detector, and an objective lens. The laser source, the transmission light path, and the objective lens of each OPU are laterally misaligned with one another. The photo detector, the reception light path, and the objective lens of each OPU are laterally aligned with one another. In the stacked individual OPU pair design, the transmission and reception light paths, the laser source, and the photo detector of each OPU are individually housed in the housings of the OPUs. In the integrated OPU pair design, the transmission and reception light paths, the laser source, and the photo detector of each OPU are in respective portions contained in the common housing.

An embodiment of the present invention provides an optical tape data storage machine for reading and writing to an optical tape configured to move along a tape path. The machine includes a plurality of optical pickup assemblies. Each optical pickup assembly includes first and second OPUs. The OPUs of each optical pickup assembly are either stacked on each other in separate housings or integrated together in a common housing such that the OPUs of each optical pickup assembly are arranged laterally across the tape path. The optical pickup assemblies are positioned at respective longitudinal positions along the tape path such that the OPUs of each optical pickup assembly are arranged laterally across the tape path at the respective longitudinal position of the tape path.

An embodiment of the present invention provides an optical tape data storage system. The system includes an optical tape configured to move along a tape path, the optical tape having a tape width. The system further includes an optical pickup assembly including a first OPU and a second OPU. The OPUs are either stacked on each other in separate housings or integrated together in a common housing such that the OPUs are arranged laterally across the tape width and are positioned at a longitudinal position along the tape path.

BRIEF DESCRIPTION OF THE DRAWINGS

FIG. 2 illustrates a side perspective view of one of the optical pickup units of the optical pickup assembly;

FIG. 6 illustrates a perspective view of an optical data storage tape machine having two sets of pluralities of optical pickup assemblies dispensed on the opposite side of respective segments of an optical data storage tape from respective tape stabilizers longitudinally along the tape path;

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
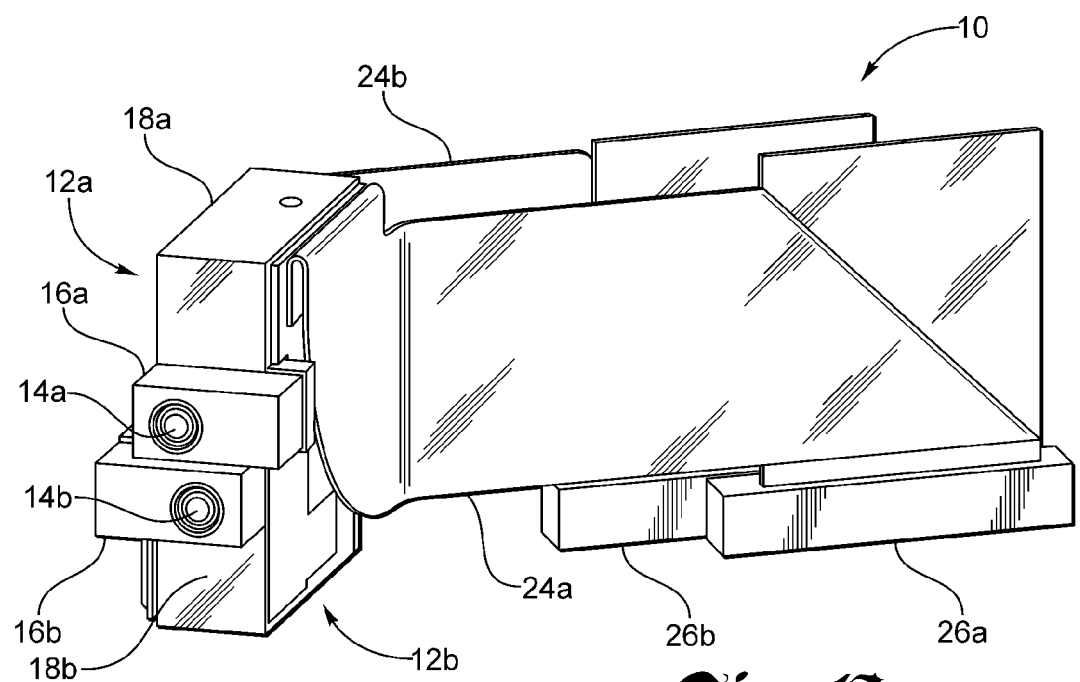
FIG. 1A illustrates a frontal perspective view of an optical pickup assembly having a pair of optical pickup units stacked together in accordance with an embodiment of the present invention.
Figure 1B:
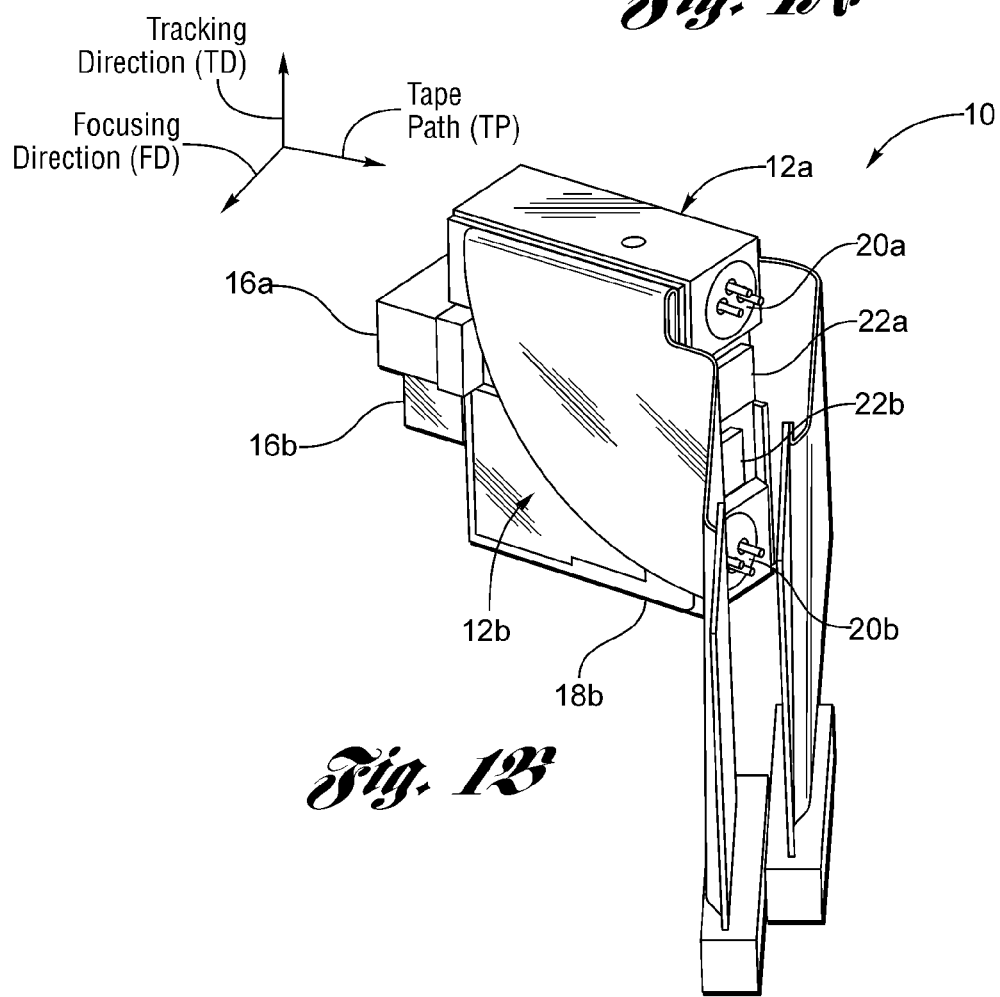
FIG. 1B illustrates a rearward perspective view of the optical pickup assembly as shown in FIG. 1A.

Referring now to FIGS. 1A and 1B, frontal and rearward perspective views of an optical pickup assembly 10 having a pair of optical pickup units 12a, 12b stacked together in accordance with an embodiment of the present invention are shown. Optical pickup assembly 10 has a stacked individual OPU pair design. In this design, first optical pickup unit (OPU) 12a and second OPU 12b are "stacked" together to form optical pickup assembly 10 such that OPUs 12a, 12b are arranged laterally across the tape width of an optical data storage tape when the optical tape is positioned adjacent optical pickup assembly 10. That is, OPUs 12a, 12b are stacked on each other to form optical pickup assembly 10 with the first (or upper) OPU 12a being laterally above the second (or lower) OPU 12b with respect to the tape width of an optical tape.

Referring now to FIG. 2, with continual reference to FIGS. 1A and 1B, a side perspective view of first OPU 12a of optical pickup assembly 10 is shown. OPUs 12a, 12b each include the same type of components. Thus, it will be understood that second OPU 12b includes the same type of components as first OPU 12a as shown in FIG. 2 and as described herein and that the operation of the same type of components is the same between the OPUs 12a, 12b.

First OPU 12a includes an objective lens 14a, a focus and tracking actuator assembly housing 16a, an OPU housing 18a, a laser diode 20a, and a photo detector 22a. First OPU 12a further includes a flexible cable 24a which terminates at one end into a flexible connector 26a. Connector 26a is for connection to an external device (see FIG. 6). The other end of cable 24a is connected to laser diode 20a and photo detector 22a. Similarly, second OPU 12b includes an objective lens 14b, a focus and tracking actuator assembly housing 16b, an OPU housing 18b, a laser diode 20b, and a photo detector 22b. Second OPU 12b further includes a flexible cable 24b which terminates at one end into a flexible connector 26b. Connector 26b is for connection to the external device (see FIG. 6). The other end of cable 24b is connected to laser diode 20b and photo detector 22b.

Figure 4:
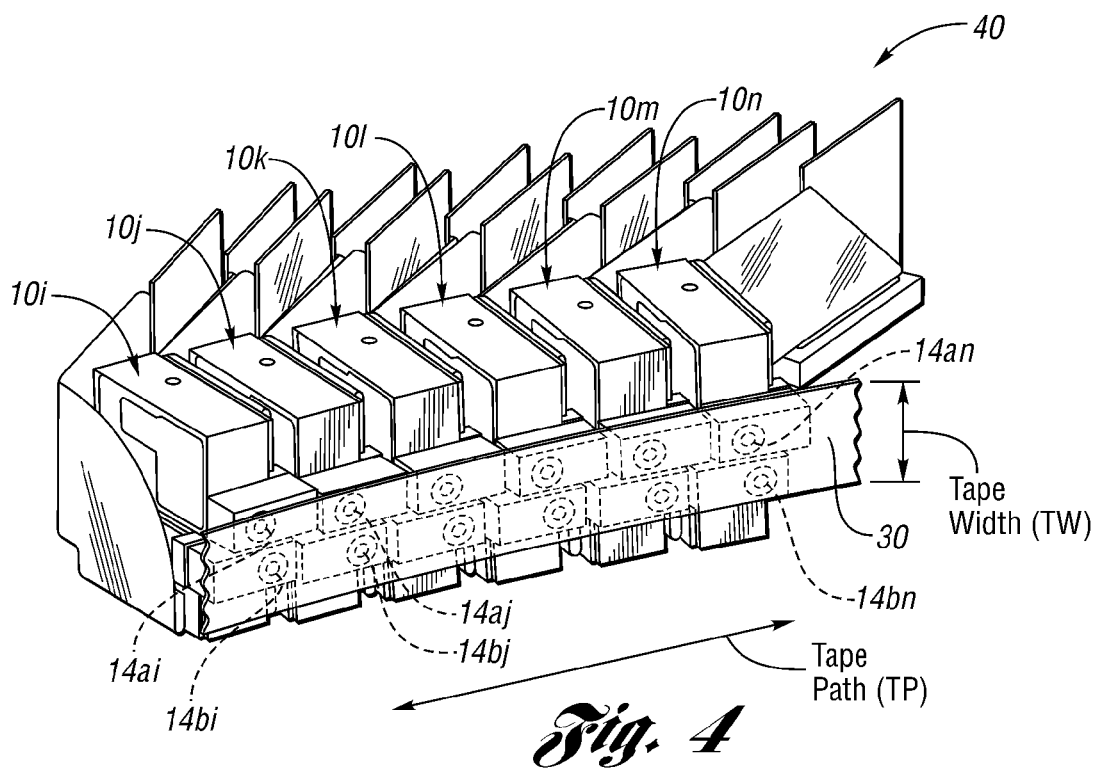
FIG. 4 illustrates a perspective view of one set of a plurality of optical pickup assemblies dispensed on one side of an optical data storage tape longitudinally along the tape path.
Figure 5:
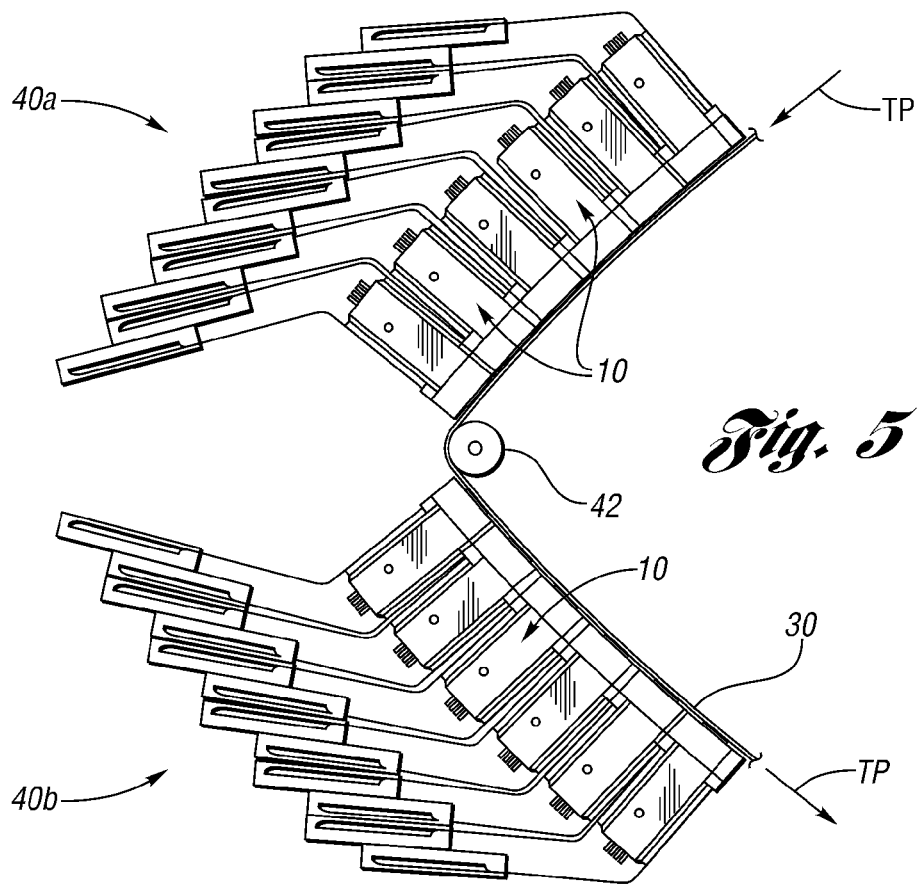
FIG. 5 illustrates a plan view of two sets of pluralities of optical pickup assemblies dispensed on one side of two respective segments of an optical data storage tape longitudinally along the tape path.

In a writing operation of first OPU 12a, a laser beam from laser diode 20a is directed into OPU housing 18a along an optical path to a mirror 27a, through a projection lens set 28a, and out from objective lens 14a onto a portion of an optical tape 30 positioned in front of objective lens 14a (shown in FIGS. 4, 5, and 6). In a reading operation of OPU 12a, reflected light from the portion of optical tape 30 is received through objective lens 14a into OPU housing 18a along another optical path through a reflection lens set 32a onto photo detector 22a.

First OPU 12a further includes a polarizing beam splitter 34a. Beam splitter 34a directs the laser beam from projection lens set 28a out to objective lens 14a and directs the reflected light from objective lens 14a into reflection lens set 32a for reception by photo detector 22a.

The writing and reading operations of second OPU 12b are similarly performed with similar components of OPU 12b.

The arrow TP in FIG. 1A illustrates the tape path direction. Optical tape 30 moves along tape path direction TP and across and over objective lens 14a, 14b of optical pickup assembly 10 during the writing and reading operations.

A tracking (lateral) actuator in focus and tracking actuator assembly housing 16a (16b) is configured to move objective lens 14a (14b) in the tracking direction indicated by the arrow TD in FIG. 1A. Likewise, a focus actuator in focus and tracking actuator assembly housing 16a (16b) is configured to move objective lens 14a (14b) in the focusing direction indicated by the arrow FD in FIG. 1A.

In first OPU 12a, an optical grating 36a may be provided adjacent beam splitter 34a. Optical grating 36a is used to split the laser beam emitted from laser diode 20a into multiple beams, creating multiple spots, typically three, at the surface of optical tape 30. The additional two spots may be used for generating a differential push-pull tracking error signal that compensates the standard push-pull tracking error signal offset experienced as objective lens 14a moves from its center position. Optical grating 36a may be eliminated when tracking sensors are used to track the movement of objective lens 14a in the tracking direction TD. Further in first OPU 12a, beam splitter 34a may be provided with a quarter-wave retardation plate 38a. Second OPU 12b may be similarly configured with an optical grating and/or a quarter-wave retardation plate.

Figure 3A:
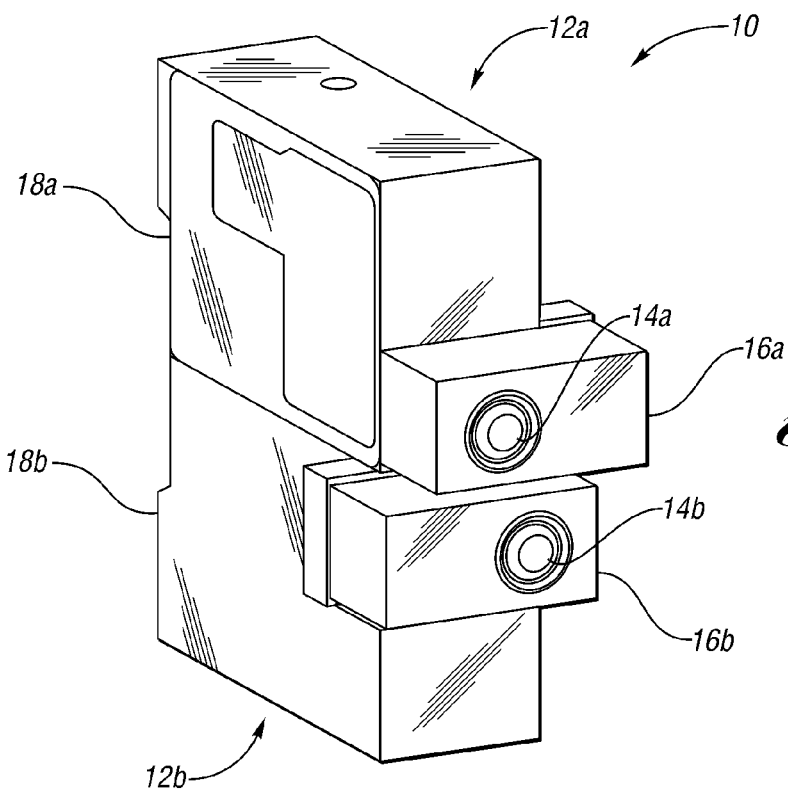
FIG. 3A illustrates a frontal perspective view of the optical pickup assembly with just the objective lens, the focus and tracking actuator assembly housing, and the OPU housing of each of the optical pickup units of the optical pickup assembly being illustrated.
Figure 3B:
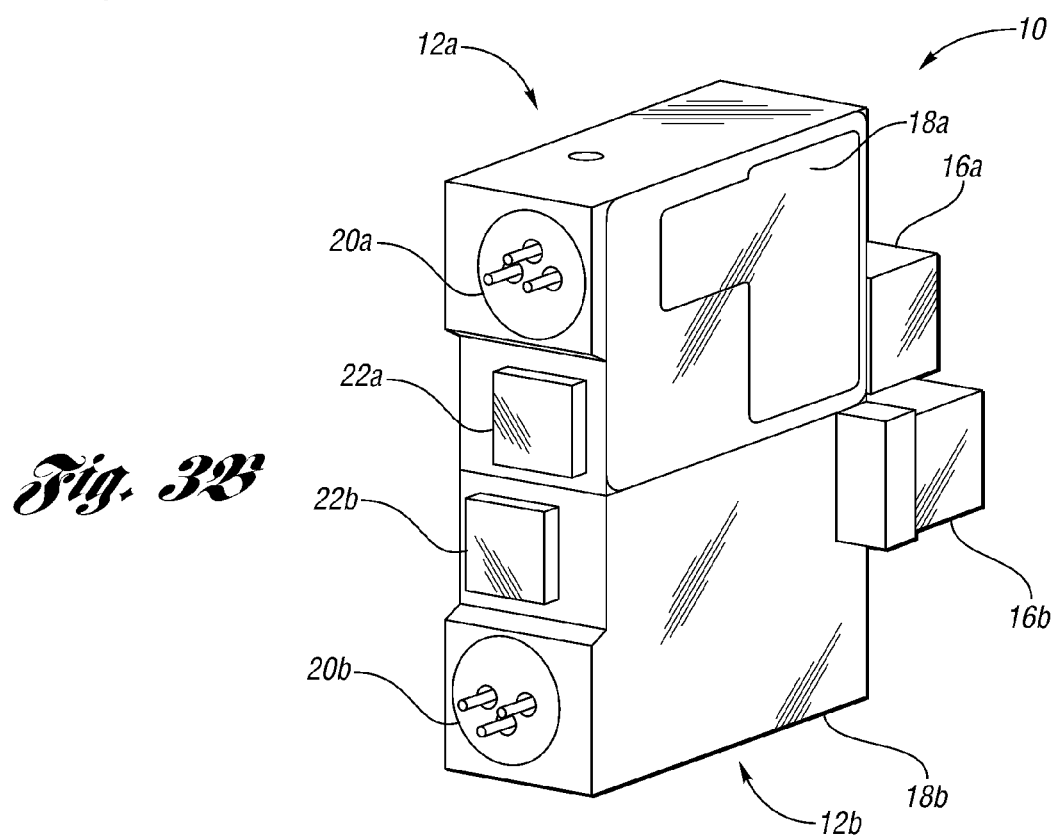
FIG. 3B illustrates a rearward perspective view of the optical pickup assembly as shown in FIG. 3A.

FIG. 3A illustrates a frontal perspective view of optical pickup assembly 10 with just objective lens 14a, 14b, focus and tracking actuator assembly housing 16a, 16b, and OPU housing 18a, 18b of each OPU 12a, 12b being illustrated. FIG. 3B illustrates a rearward perspective view of optical pickup assembly 10 as shown in FIG. 3A.

As described above and as shown in FIGS. 1A, 1B, 3A, and 3B, an optical pickup assembly 10 in accordance with an embodiment of the present invention stacks individual OPUs together so that two OPUs 12a, 12b are arranged laterally across the width of an optical tape 30 positioned adjacent optical pickup assembly 10. As further shown in FIGS. 1A, 1B, 3A, and 3B, objective lenses 14a, 14b of OPUs 12a, 12b are nominally near the edge of the package with objective lenses 14a, 14b being longitudinally offset from one another. Objective lenses 14a, 14b are also roughly less than one-half the tape width apart in order that all tracks on optical tape 30 may be accessible for reading and writing.

With reference to FIGS. 4, 5, and 6, a plurality of optical pickup assemblies 10 may be arranged longitudinally along the tape path in a drive. As each optical pickup assembly 10 includes a pair of OPUs 12a, 12b, multiple pairs of OPUs 12a, 12b are arranged at respective longitudinal positions along the tape path. Compared with conventional optical pickup assemblies having a single OPU, 50% fewer optical pickup assemblies 10 are required for a given length of the tape path as each optical pickup assembly 10 includes a pair of OPUs. As a result, space in the drive and along the tape path is conserved.

FIG. 4 illustrates a perspective view of a set 40 of a plurality of optical pickup assemblies 10 dispensed on one side of an optical tape 30. Optical pickup assemblies 10 are arranged next to one another longitudinally along the tape path TP. As an example, the plurality of optical pickup assemblies 10 includes i, j, . . . , n optical pickup assemblies 10. OPUs 12a, 12b of each optical pickup assembly 10 are arranged laterally (i.e., in the tracking direction TD) across the tape width TW with upper OPU 12a being adjacent the upper portion of the width of optical tape 30 and lower OPU 12b being adjacent the lower portion of the width of optical tape 30.

As further shown in FIG. 4, optical pickup assemblies 10 are positioned such that objective lenses 14a, 14b of each optical pickup assembly 10 are laterally offset from respective objective lenses 14a, 14b of the neighboring optical pickup assemblies 10. For instance, as shown in FIG. 4, optical pickup assemblies 10 are arranged longitudinally along the tape path with the order being (from left to right looking at FIG. 4) a first optical pickup assembly 10i, a second optical pickup assembly 10j, other optical pickup assemblies 10, and a last optical pickup assembly 10n. Objective lens 14aj of the upper OPU of second optical pickup assembly 10j is laterally a bit lower than objective lens 14ai of the upper OPU of first optical pickup assembly 10i. Likewise, objective lens 14bj of the lower OPU of second optical pickup assembly 10j is laterally a bit lower than objective lens 14bi of the lower OPU of first optical pickup assembly 10i. This pattern continues with neighboring optical pickup assemblies 10 longitudinally along the tape path with objective lenses 14an, 14bn of last optical pickup assembly 10a being laterally the lowest compared with corresponding objective lenses 14a, 14b of the other optical pickup assemblies 10.

The particular laterally offset pattern of objective lenses 14a, 14b of optical pickup assemblies 10 is not germane to the end goal. The goal is that objective lenses 14a, 14b of optical pickup assemblies 10 are laterally positioned as a group across the tape width such that all desired tracks on the optical tape may be read and written. The configuration shown in FIG. 4 is just one out of many different configurations which satisfy this goal.

FIG. 5 illustrates a plan view of two sets 40a, 40b of pluralities of optical pickup assemblies 10 dispensed on one side of two respective segments of an optical tape 30. Optical tape 30 is positioned adjacent optical pickup assemblies 10 and faces the objective lenses of optical pickup assemblies 10. Optical tape 30 is routed along a capstan 42 positioned between the two sets 40a, 40b of optical pickup assemblies 10 and is entrained about two respective tape stabilizers (not shown) dispensed on the other side optical tape 30. Optical tape 30 moves in the tape path TP direction across and over the objective lenses of optical pickup assemblies 10 for optical pickup assemblies 10 to read and/or write to optical tape 30.

FIG. 6 illustrates a perspective view of an optical tape machine 50 having two sets 40a, 40b of pluralities of optical pickup assemblies 10 dispensed on the opposite side of two respective segments of an optical tape 30 from two respective tape stabilizers 54a, 54b. Optical tape machine 50 includes a deck baseplate 52 on which the components of optical tape machine 50 including optical pickup assemblies 10 are dispensed. Optical tape machine 50 further includes an electronics board 56 of an external device to which connectors 26 of optical pickup assemblies 10 are respectively attached.

Lower OPUs 12b of optical pickup assemblies 10 are arranged on deck baseplate 52. As described above, upper OPUs 12a of optical pickup assemblies 10 are arranged on the respective lower OPUs 12b of optical pickup assemblies 10. In operation, laser diodes 20 of optical pickup assemblies 10 are cooled primarily by conduction of heat through the stacked OPU housings 18 and into deck baseplate 52. Additional cooling may be achieved via convection, with the majority of cooling being via conduction. In particular, heat from the laser in upper OPU 12a of an optical pickup assembly 10 conducts through OPU housing 18b of lower OPU 12b of this optical pickup assembly and then into deck baseplate 52. Heat from the laser in lower OPU 12b of this optical pickup assembly conducts through OPU housing 18b of lower OPU 12b directly into deck baseplate 52.

As described, in the stacked individual OPU pair design, an optical pickup assembly in accordance with embodiments of the present invention includes a pair of individual OPUs which are stacked on each other such that the OPUs are laterally arrayed across the tape width of an optical tape. This configuration addresses arrangement of multiple OPUs in a constrained amount of available longitudinal space. This configuration enables a larger quantity of OPUs and therefore higher data rates.

Figure 7A:
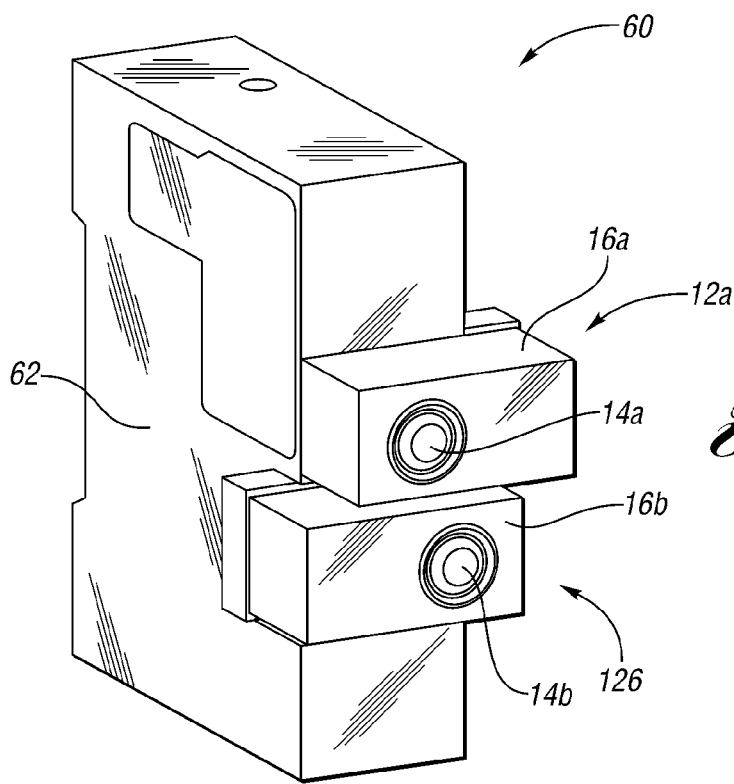
FIG. 7A illustrates a frontal perspective view of an optical pickup assembly having a pair of optical pickup units integrated together in a common housing as part of the same package in accordance with an embodiment of the present invention with just the objective lens and the focus and tracking actuator assembly housing of each of the optical pickup units being illustrated.
Figure 7B:
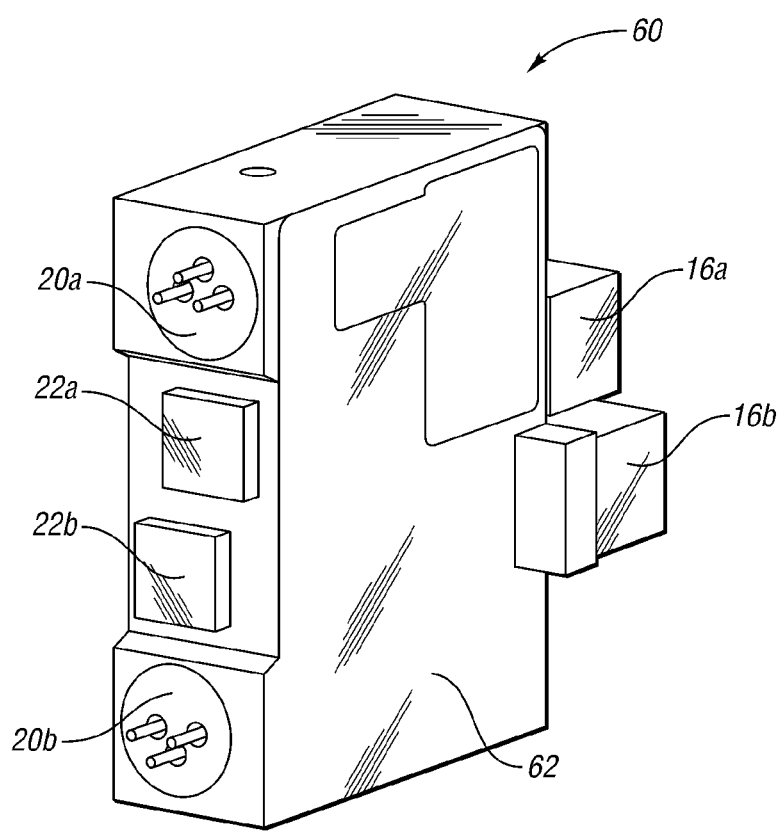
FIG. 7B illustrates a rearward perspective view as shown in FIG. 7B.
Figure 8:
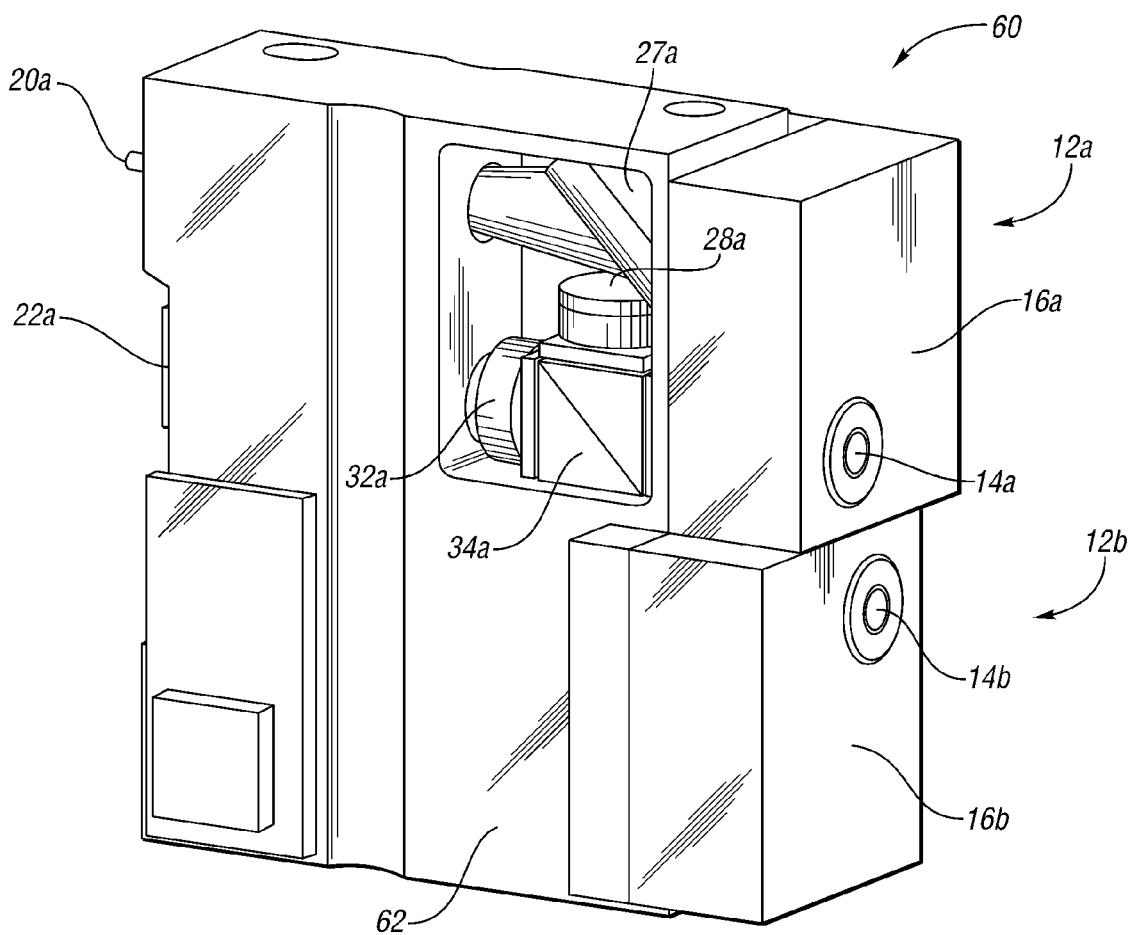
FIG. 8 illustrates a side perspective view of the optical pickup assembly shown in FIGS. 7A and 7B.

Referring now to FIGS. 7A, 7B, and 8, an optical pickup assembly 60 having OPUs 12a, 12b integrated together in a common housing 62 as part of the same package in accordance with an embodiment of the present invention will be described. FIGS. 7A and 7B illustrate frontal and rearward perspective views of optical pickup assembly 60 with just objective lens 14a, 14b and focus and tracking actuator assembly housing 16a, 16b of each OPU 12a, 12b being illustrated. FIG. 8 illustrates a side perspective view of optical pickup assembly 60.

Optical pickup assembly 60 has an integrated OPU pair design. In this design, OPUs 12a, 12b are integrated together in a common housing 62 as part of the same package to form optical pickup assembly 60 such that OPUs 12a, 12b are arranged laterally across the tape width of an optical tape when the optical tape is positioned adjacent optical pickup assembly 60. That is, OPUs 12a, 12b are integrated or "paired" together in the same package to form optical pickup assembly 60 with the first (or upper) OPU 12a being laterally above the second (or lower) OPU 12b with respect to the tape width of an optical tape. As indicated in FIG. 8, the components of each OPU 12a, 12b are contained in respective portions of common housing 62.

As described, in the integrated OPU pair design, an optical pickup assembly in accordance with embodiments of the present invention includes two OPUs contained in the same package. This may enable closer spacing of the two objective lenses, but each OPU is not individually replaceable in the event of failure. However, this implementation has the advantages of better conduction of heat away from the laser diode and the elimination of potential manufacturing tolerances relating to the vertical mounting of two separate OPUs in a tape deck.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An optical pickup assembly comprising:
a housing having adjoining first and second compartments therein, the first compartment being encased within a top portion of the housing and the second compartment being encased within a bottom portion of the housing with the first and second compartments being adjoined on one another within the housing;
a first optical pickup unit having a first objective lens, a first transmission light path, a first laser source, a first reception light path, a first photo detector, and a first beam splitter, wherein the first transmission and reception light paths separately extend from one another between the first beam splitter and the first laser source and the first photo detector, respectively; and
a second optical pickup unit having a second objective lens, a second transmission light path, a second laser source, a second reception light path, a second photo detector, and a second beam splitter, wherein the second transmission and reception light paths separately extend from one another between the second beam splitter and the second laser source and the second photo detector, respectively;
wherein the optical pickup units are integrated together in the housing with the first transmission and reception light paths and the first beam splitter contained within the first compartment of the housing and the second transmission and reception light paths and the second beam splitter contained within the second compartment of the housing;
wherein the optical pickup units are arranged laterally above one another across a tape path extending in a longitudinal direction and are both positioned at the same longitudinal position along the tape path with the objective lens of one of the optical pickup units being laterally higher across the tape path than the objective lens of the other one of the optical pickup units at the same longitudinal position of the optical pickup units.

2. The assembly of claim 1 wherein:
the objective lenses of the optical pickup units are longitudinally offset from one another along the tape path.

3. An optical tape data storage system comprising:
a housing having adjoining first and second compartments therein, the first compartment being encased within a top portion of the housing and the second compartment being encased within a bottom portion of the housing with the first and second compartments being adjoined on one another within the housing;
an optical tape configured to move along a tape path, the optical tape having a tape width; and
an optical pickup assembly including a first optical pickup unit and a second optical pickup unit, wherein each optical pickup unit has an objective lens, wherein the first optical pickup unit further includes a first transmission light path, a first laser source, a first reception light path, a first photo detector, and a first beam splitter and the second optical pickup unit further includes a second transmission light path, a second laser source, a second reception light path, a second photo detector, and a second beam splitter, wherein the first transmission and reception light paths separately extend from one another between the first beam splitter and the first laser source and the first photo detector, respectively, wherein the second transmission and reception light paths separately extend from one another between the second beam splitter and the second laser source and the second photo detector, respectively;
wherein the optical pickup units are integrated together in the housing with the first transmission and reception light paths and the first beam splitter contained within the first compartment of the housing and the second transmission and reception light paths and the second beam splitter contained within the second compartment of the housing;
wherein the optical pickup units are arranged laterally above one another across the tape width and are both positioned at the same longitudinal position along the tape path with the objective lens of one of the optical pickup units being laterally higher across the tape width than the objective lens of the other one of the optical pickup units at the same longitudinal position of the optical pickup units.

4. The system of claim 3 wherein:
the objective lens of the optical pickup units are longitudinally offset from one another along the tape path.

* * * * *